United States Patent [19]

Bailey et al.

[11] 4,147,197

[45] Apr. 3, 1979

[54] FIRE DOOR AND OPERATOR THEREFOR

[75] Inventors: Morris W. Bailey, Fort Worth; John J. Luby, Dallas, both of Tex.; Donald G. Carlton, Orangevale, Calif.

[73] Assignee: Overhead Door Corporation, Dallas, Tex.

[21] Appl. No.: 807,926

[22] Filed: Jun. 20, 1977

[51] Int. Cl.$^2$ .......................... B01D 1/22; B01D 1/14

[52] U.S. Cl. ............................................ 160/7; 160/8

[58] Field of Search ........................................ 160/7, 8

[56] References Cited

U.S. PATENT DOCUMENTS

| | | | |
|---|---|---|---|
| 1,275,168 | 8/1918 | McCloud | 160/8 |
| 1,290,169 | 1/1919 | Gervais | 160/7 |
| 1,290,514 | 1/1919 | Collins | 160/7 |
| 1,617,440 | 2/1927 | Duncanson | 160/8 X |
| 2,038,523 | 4/1936 | Cahill | 160/7 |
| 2,564,208 | 8/1951 | Michelman | 160/7 X |

FOREIGN PATENT DOCUMENTS 604572 7/1948 United Kingdom ........................ 160/7

*Primary Examiner*—Philip C. Kannan
*Attorney, Agent, or Firm*—Blanchard, Flynn, Thiel, Boutell & Tanis

[57] ABSTRACT

There is provided a roll-type door having horizontally positioned slats which is normally held by operator means in an open position against gravity. Said operator means includes fusible means responding to a predetermined heat level for releasing said door and permitting same to move under gravity in a closing direction. Said operator means includes a device for initiating said door movement immediately after the response of said fusible means to said heat level and further includes a connection to braking means for insuring against too rapid a descent by the door. The door may be manually opened if desired or mechanical means, power driven if desired, may be provided for opening or assisting in opening such door. In the latter case, clutch means are provided for disconnecting same immediately upon breakdown of said fusible means whereby said door will be enabled to close freely in response to gravity subject only to control by the above-mentioned braking means.

7 Claims, 13 Drawing Figures

FIG. 6
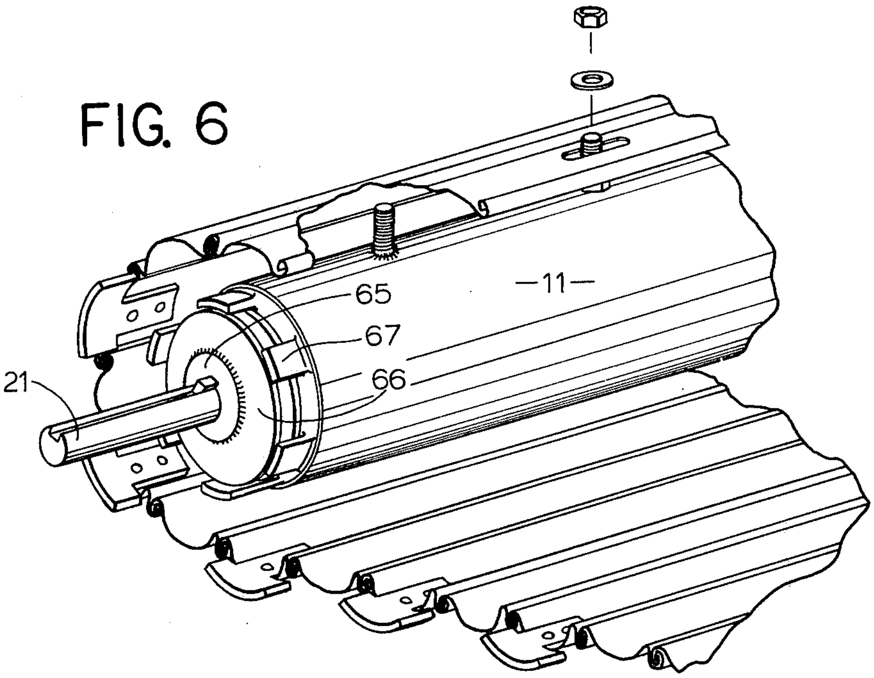
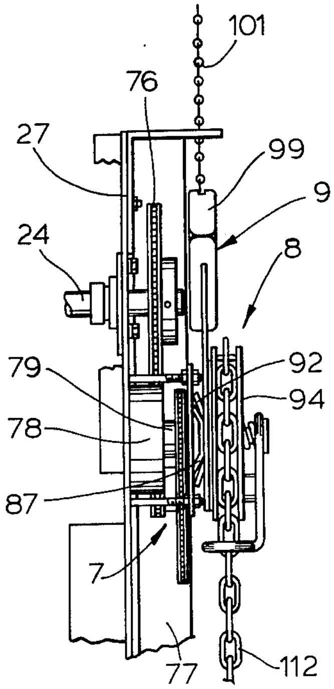
FIG. 8
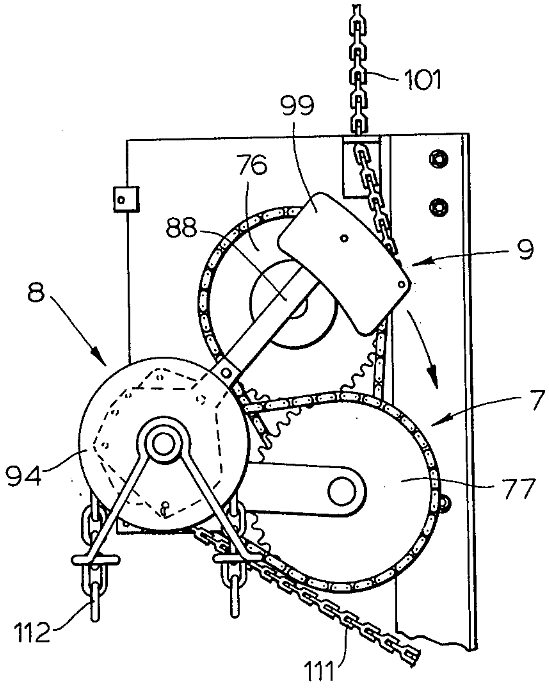
FIG. 7

FIRE DOOR AND OPERATOR THEREFOR

FIELD OF THE INVENTION

This invention relates to a roll-type door construction, primarily a fire door, together with operator means by which said door is normally held in an open position but which will respond to the melting of fusible means at a predetermined heat level to permit said door to close under gravity. Means are provided for controlling the rate of closure of such door and in some instances means are provided for mechanically assisting the opening of said door or for opening such door entirely by power means.

BACKGROUND OF THE INVENTION

In the development of fire doors, it is recognized that the door should be arranged for closure by means independent of power sources which may be damaged by the same fire which the door is intended to guard against. Accordingly, fire doors are normally made for closure in response to gravity and a variety of arrangements for this purpose are well known. For this purpose, roll-type doors comprising horizontal metallic slats are in many instances highly advantageous due to their minimal space requirements for installation and due to their being out of the way above the door when in an inactive condition.

There has, however, been a continuing problem with such doors in that when they are sufficiently counterbalanced by internal torsion springs to render them reasonably easy to open, they tend to have insufficient closing tendency in response to gravity to be reliable. On the other hand, when the counterbalancing is weakened sufficiently to insure prompt and positive closing, the door then becomes relatively difficult to open or when closing it may do so too rapidly and inflict injuries upon persons who may be in a position thereunder. Thus, it is not only extremely difficult to adjust the torsion of the counterbalancing springs sufficiently accurately to obtain the desired action, but same may change after adjustment due to fatiguing of the metal or due to the ambient heat generated by the fire against which the door is intended to close.

In attempting to meet this and other problems of fire door constructions of this general type, it has in the past been known to initiate rotation of the door-carrying roll by some type of spring-loaded or weight-responsive device upon the occurrence of an appropriate signal, such as the melting of a fusible link, and permitting the door thereupon to continue its descent by gravity. Inasmuch as the gravitational force progressively increases as the door unwraps, this still results in severe shock to the door which could even be sufficiently severe to cause serious damage thereto. In an attempt to meet this problem, the prior art has provided speed limiting devices generally similar to a clock escapement wherein the door applies power thereto in the manner of clock weights and the escapement limits the speed at which the door can descend. This, however, has presented difficulties in the past due to insufficient power applied by the door to the escapement mechanism when the door is only starting to unwrap. This can be especially true if the mechanism has stood stationary for several months, or even years, with such accumulation of dirt and other contaminants as to render its moving parts stiff and requiring considerable force to overcome the friction present therein.

It has therefore long been desirable to devise a door construction which will effect a positive and certain starting of the unwrapping movement of the door, which will reliably limit the ultimate speed of descent of the door, but which will provide a minimum of frictional or other obstruction to the descent of the door in its initial descending condition, and which when the door moves slowly will not add to or increase the frictional resistance applied thereto.

Accordingly, the objects of the invention include:

1. To provide a roll-type fire door having horizontal metal slats, together with an operator, hand operated chain hoist, hand crank or other mechanical means of opening and closing the door during normal conditions, whereby the door will normally be held in an open position, will respond to ambient heat above a predetermined level to permit same to close by gravity and wherein such closure will be positive and certain but yet sufficiently controlled to insure against injury to the door or to persons thereunder.

2. To provide a fire door together with door operating means, as aforesaid, including means immediately responsive to said ambient temperature for positively initiating downward movement of such door. 3. To provide a fire door together with door operating means, as aforesaid, including centrifugal brake means by which the speed at which said door closes may be selected and controlled as desired.

4. To provide a fire door together with door operating means, as aforesaid, including mechanical assist, or power driven, means for opening said door, which means will be automatically disconnected simultaneously with initiation of door closure movement whereby such means will not interfere with the gravity induced closure movement of the door.

5. To provide a fire door and operator means, as aforesaid, including mechanical assist or power driven means for opening said door, which last-named means may be manually or pedally re-engaged after closure of the door for reopening same, as for emergency escape use, but which will then automatically permit the door to reclose when the manual or pedal operation is removed.

6. To provide a fire door and operator means therefor, as aforesaid, which will throughout be of relatively simple but sturdy construction, which will be free from the necessity for fine or delicate adjustments, which can stand inoperative for long periods of time without material change in operating characteristics and which will in all respects be reliable for operation in its intended manner.

7. To provide a fire door and operator means therefor, as aforesaid, which will utilize in large measure presently known roll-type door construction, (and thus require relatively little additional special equipment), whereby to obtain the objectives above set forth at a minimum of cost.

Other objects and purposes of the invention will be apparent to persons acquainted with apparatus of this general type upon reading the following specification and inspection of the accompanying drawings.

BRIEF DESCRIPTION OF THE DRAWINGS

In the drawings:

FIG. 6 is an oblique view of the roll partially exploded and partially unwrapped and showing particularly the same driving mechanism as shown in FIG. 5.

FIG. 7 is an end elevational view of the braking mechanism and lifting mechanism at the end of the roll opposite to that shown in FIGS. 3–6.

FIG. 8 is a front elevational view of the apparatus shown in FIG. 7.

SUMMARY OF THE INVENTION

Briefly, the objectives above set forth are obtained by providing an essentially standard roll-type door having horizontal metal slats and utilizing torsion spring counterbalancing means. Said counterbalancing means are, however, of such magnitude with respect to the weight of the door that the door will in all normal positions other than full open position have a strong and reliable tendency to close by gravity. Separate spring tension means are arranged for release when the ambient temperature exceeds a predetermined level for applying a positive rotative motion to the roll carrying the door slats for initiating the closing of said door and insuring sufficient such movement to attain a position where gravity will take over and continue the closing motion. Other means are provided which are actuated by the closing movement of the door for engaging brake means by which the closing movement of said door is controlled and held within a desired rate of speed. In the illustrated embodiment, such brake means are centrifugally actuated and are driven rotatively by rotation of the drum upon which the door is mounted and which is caused to rotate as said door moves gravitationally into its closed position. After closing, as for test purposes, such door may then be reopened by direct manually applied force if desired or, for larger doors, such manually applied force may be mechanically assisted or the opening of the door may be effected entirely by power driven rotation of the door carrying drum. In the case of such manual assist or power driven means, same is automatically disconnected simultaneously with the release of the above-mentioned initiating means in order that the closing of the door will not to any degree be inhibited by the presence of such opening mechanism. Likewise, by effecting such disconnecting automatically, same is not subject to the memory or will, or even presence, of operating personnel.

DETAILED DESCRIPTION

While, as above indicated, many of the components of apparatus embodying the invention will be of conventional nature, and hence may in accordance with presently known technology be freely chosen and modified as required to fit particular circumstances, certain particular embodiments of the apparatus will be herein described and illustrated to exemplify the invention. The choice of these specific modifications, however, should be understood as being illustrative and not limiting.

Figure 1:
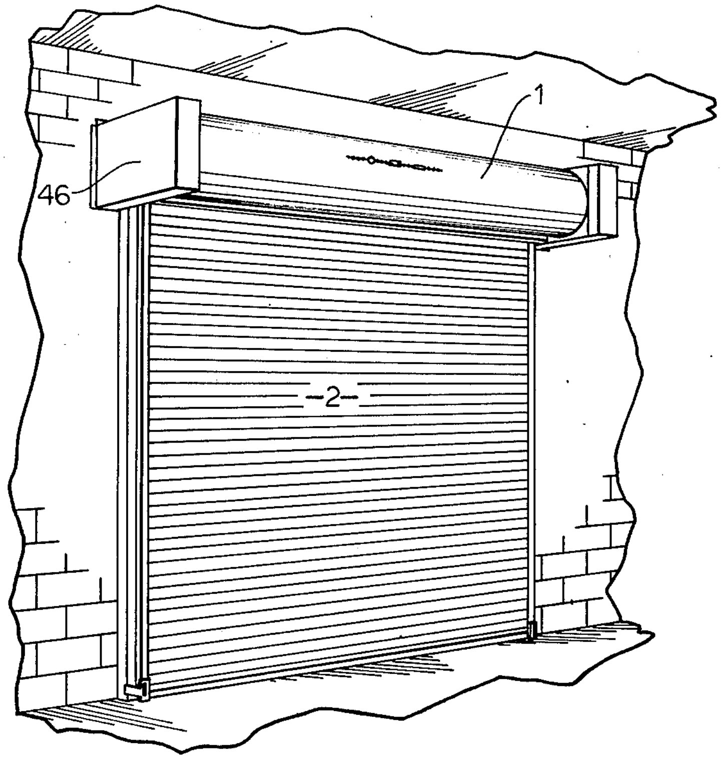
FIG. 1 is an oblique view of a door of the type of which the invention is applied.
Figure 1A:
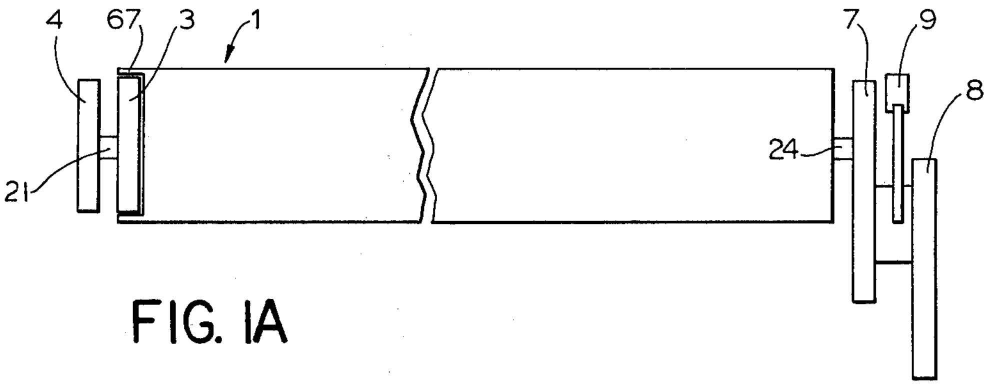
FIG. 1A is a schematic representation of the parts comprising the operating portion of said door.

Turning now to FIG. 1, there is shown apparatus embodying the invention and comprising a roll section 1 carrying a horizontally slatted door 2 wrapped thereon and internal torsion means (elsewhere illustrated) contained therein. At one end of said roll section (here the left end), there is provided a tension wheel device 4 (FIG. 1A) which acts through an impact device 3 for positively driving the door carrying roll 1 when unrolling of door 2 is required. At the other end of said roll section there is provided control means 7 by which the speed of closing of the door is limited, rewind or door opening means 8 and disconnect means 9 through which said rewind means is disconnected from the roll section when the door is set for opening in response to a predetermined signal, usually the melting of a fusible link in response to its attainment of a predetermined temperature.

Figure 2:
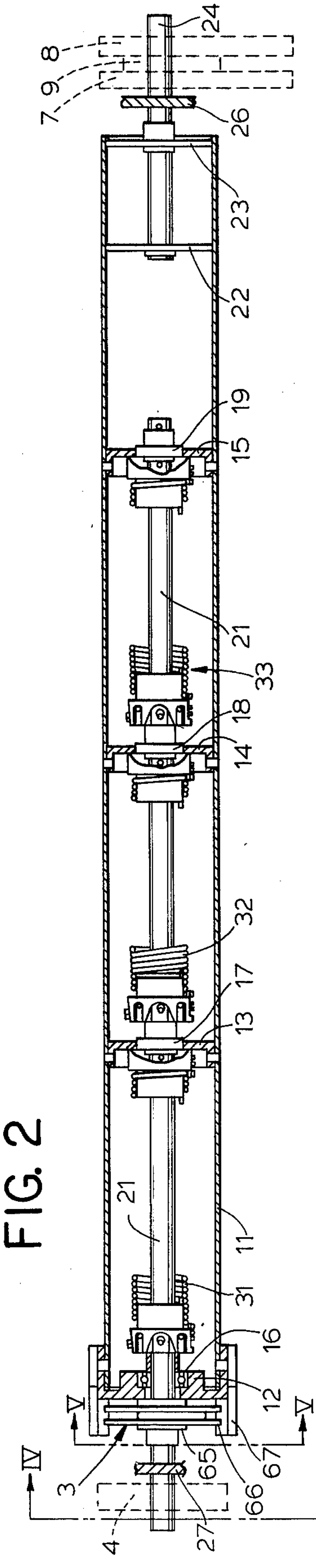
FIG. 2 is a longitudinal central section through the roll on which the door is wrapped with some parts indicated schematically.

Considering first the roll section 1, this is shown in central section in FIG. 2. Roll section 1 includes a door supporting barrel or roll 11, of elongated cylindrical shape and made from any convenient material such as steel, which barrel is rotatably mounted by flanges 12–15 and bearings 16–19 upon a normally non-rotating shaft 21. The barrel 11 is further supported through flanges 22 and 23 on the shaft 24 for rotation therewith. Shaft 21 is mounted rotatably in appropriate frame member 27 and shaft 24 is rotatably mounted in frame member 26 in any desired manner. Conventional counterbalance spring mechanisms 31–33 are mounted as desired, here by being connected at one end of each thereof to the shaft 21 and at the other end of each thereof to one of the barrel flanges 13–15. Thus, in a known manner the springs are appropriately pretensioned with the door fully wrapped onto the barrel 11 and the tensioning is so sensed that as the door moves downward into closed position such tensioning is increased to compensate for the increasing amount of such door that at a given moment is suspended from the barrel 11.

Figure 4:
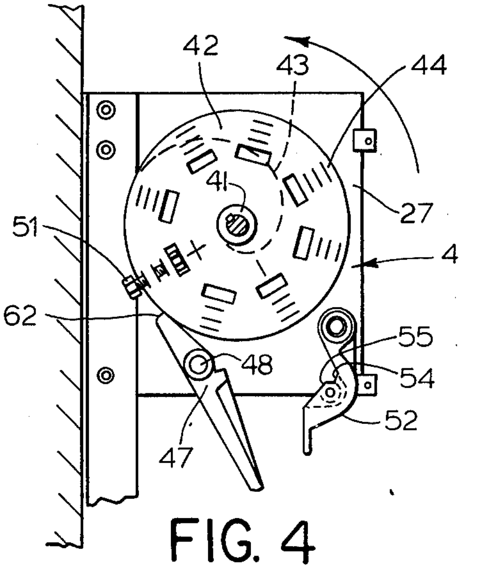
FIG. 4 is an end elevational view of the same subject matter as FIG. 3 substantially as indicated by section line IV—IV of FIG. 2.
Figure 3A:
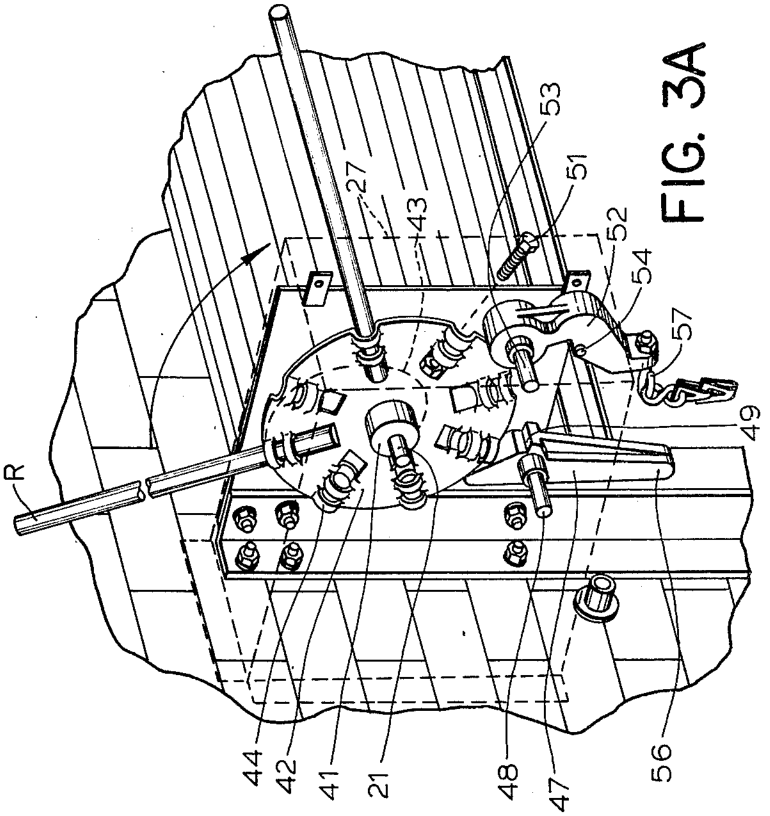
FIG. 3A is the same as FIG. 3 showing the mechanism in another condition of operation.
Figure 3:
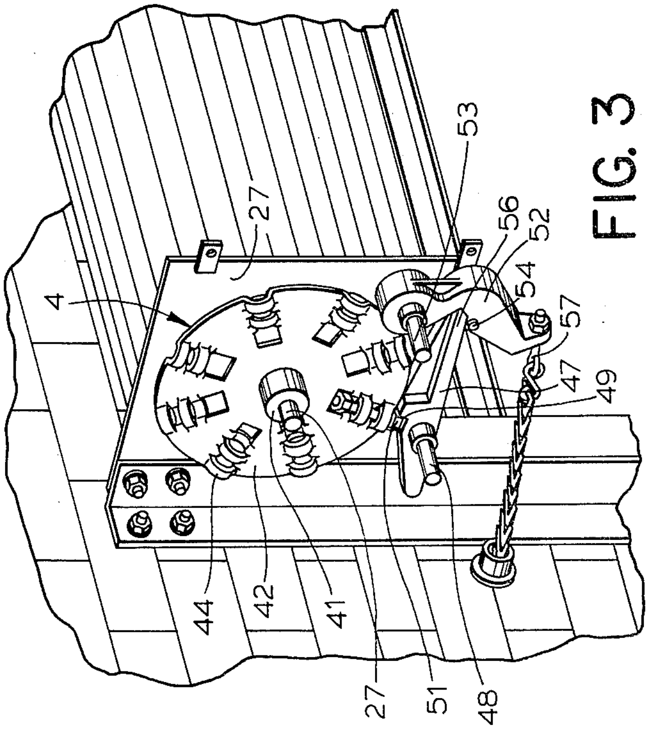
FIG. 3 is a detail of the operating mechanism at one end of said roll, said operating mechanism being shown in one condition of operation.

Turning now to the tension wheel device 4, reference is made to FIG. 3. Here a hub 41 is nonrotatably, mounted on the shaft 21, being keyed thereto as shown in FIG. 4, and supports a driving or tension plate 42. Said driving plate is provided in any conventional manner with tensioning means indicated schematically in FIG. 4 by the broken line 43 for tensioning upon rotation of said driving plate 42 in a clockwise direction as viewed in FIG. 3. Sockets, of which one is indicated at 44, are provided around the periphery of said driving plate for reception of insertable and removable bars by which said driving plate may be manually tensioned by being rotated in a clockwise direction. Any suitable closure means indicated generally at 46 (FIG. 1) may be provided if desired for protecting said tension wheel from external interference.

A pawl 47 is pivotally mounted by a shaft 48 onto any fixed reference such as the above-mentioned plate 27. Pawl 47 is provided with a notch 49 for engaging a bolt 51 received into one of said sockets 44 for normally holding the driving plate 42 against movement (counterclockwise in FIGS. 3 and 4) in response to said tensioning means 43. A catch 52 is pivotally mounted by a pin 53 to any fixed point of reference, which again may be an appropriate portion of the plate 27, and is provided with a notch 54 for receiving the end 56 of the pawl 47 and holding same in the position shown in FIG. 3. The lower end of the locking catch 52 is connected by link and chain means 57 through a fusible link (elsewhere shown) and thence through other chain and link means (also elsewhere shown) to any suitable point of anchoring, such as that described below in connection with FIG. 10. Thus, so long as the fusible link 58 is undisturbed, the chain 57 will hold the catch 52 in the position shown in FIG. 3 and thus hold the pawl 47 likewise in the position shown in FIG. 3, whereby driving plate 42 and shaft 21 are held stationary. However, when said fusible link breaks down, the clockwise rotation of said pawl 47 induced by the pressure thereon of the bolthead 51 will act against the curved bottom of the notch 54, assisted if desired by the presence of the roller 55 (FIG. 4) to move the catch 52 out of the way and permit the pawl 47 to assume the position shown in FIG. 3A. This frees the driving plate 42 and shaft 21 for a single revolution of counterclockwise rotation which is stopped when the bolthead 51 strikes the end 62 of the pawl 47, said pawl being moved into the position shown in FIGS. 3A and 4 by gravity.

Figure 5:
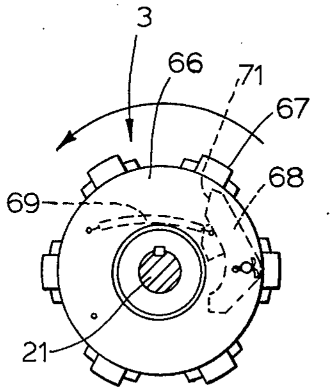
FIG. 5 is a sectional view substantially on the line V—V of FIG. 2.

Turning now to the impact device 3, same is essentially an over-running device shown in more detail in FIG. 5 and consists in this embodiment of a disk 66 which is rigidly mounted on and affixed to shaft 21. Such disk 66 is positioned concentrically, and radially inwardly of, the lugs 67 which are fixed to and project axially of the door supporting barrel 11 (see FIG. 6). The disk 66 carries one or more centrifically actuated pawls of which one is shown at 68. A relatively light spring 69 normally holds the pawls 68 in retracted position as shown but upon rotation of the disk 66 the pawl 68 will move outwardly so that its end 71 will engage one of the housing lugs 67. Thus, upon breakdown of the fusible link 58, the driving plate 42 and shaft 21 will be released for one revolution which causes a corresponding revolution of disk 66 whereby the pawl 68 is centrifugally moved outwardly and engages lug 67 to effect up to one driven rotation of the door supporting barrel 11. This starts the door downwardly and the portion unrolled by a single revolution of the barrel 11 is then sufficient to cause it to continue unrolling in response to gravity even though the driving means involving the tension wheel device 4 and impact device 3 are stopped. Of course, as soon as the rotation of the impact device 3 ceases, the spring 69 will return the pawl 68 into its retracted position as shown in FIG. 5 and will present no interference to the continued rotation of the barrel 11.

Turning now to the braking mechanism 7, this comprises driving-driven means arranged for increasing the speed of the driven member with respect to that of the barrel 11. In this instance a plurality of chain and sprocket devices 76 and 77 are arranged for driving from the barrel 11 through shaft 24 to drive a centrifugal brake 78 (FIG. 8). Said centrifugal brake is adjusted to operate at whatever speed corresponds to the maximum desired descent speed of the door and thus prevents such door from exceeding that speed.

Figure 9:
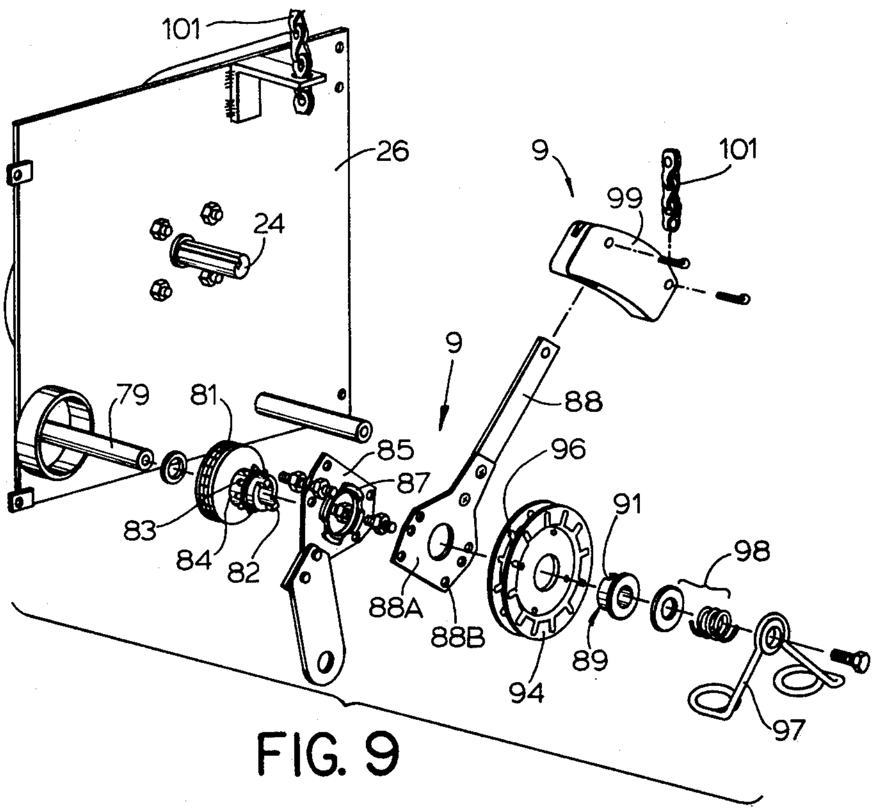
FIG. 9 is an exploded view of the mechanism shown in FIGS. 7 and 8.

When the door is down and it is desired to raise same, same may be raised manually with reliance placed upon the counterbalancing springs 31, 32 and 33 to effect rewinding rotation of the barrel 11. Preferably, however, and essentially if the door is a large and/or heavy one, there will be provided either mechanical assist means for manual door opening or power driven means for such purpose. Same is here shown generally at 8 and is here for advantageous power ratio purposes connected to the same shaft as that which drives the centrifugal brake, namely the shaft 79. While a variety of specific and known devices may be provided for this purpose, one particularly advantageous arrangement is shown in FIGS. 8 and 9, FIG. 9 showing the parts in exploded view for better clarity.

In this embodiment, the shaft 79 is fixed and carries rotatably thereon the rotative portion 81 (FIG. 9) of the centrifugal brake 78. Said portion 81 is provided at 82 with one side of a jaw clutch mechanism. Same is also provided with the sprocket teeth 83 by which same is driven from the portion 77 (FIG. 7) of the sprocket and chain system 7. Said jaw clutch means 82 includes a bearing surface 84 which projects into and is supported by a corresponding bearing surface in the plate 85 which is mounted on a bracket 86 for support in any convenient manner. Cam surfaces 87 are provided on said plate 85 for purposes appearing further hereinafter. A drop arm 88 is pivotally supported on the other part 89 of said jaw clutch, which part 89 is rotatably supported on the shaft 79. The part 89 is rigidly and concentrically secured to the sprocket 94. The jaw receptacles 91 on part 89 are arranged for engagement with the dentils on part 82 above mentioned. The side of the drop arm 88 facing the plate 85 is provided with further cam means 92 (FIG. 8) cooperating with the cam means 87 as hereinafter further described. The sprocket 94 includes teeth 96 which cooperate with chain means 112 (FIG. 7). A chain guide 97 cooperates with the sprocket 94 and is pivotally supported on shaft 79. Washer-spring-and-bolt means generally indicated at 98 complete the assembly and provide resilient pressure urging all the above-described components leftwardly as appearing in FIG. 8 toward the centrifugal brake 78.

With the drop arm 88 in the raised position as shown in FIG. 7, the structure of cams 87 and 92 is such that said arm will be in its leftward (referring to FIG. 8) position and the jaw clutch components 82 and 91 will be engaged for driving of the sprocket 83 from the sprocket 94. Said sprocket 94 may be driven in any desired manner such as chain hoist 112, crank and chain, electrical or hydraulic power or other means as desired. When said arm 88 is permitted to rotate under the influence of the weight 99 carried thereby, the cam structure 87 and 92 operates to move said arm 88 rightwardly (as seen in FIG. 8) which disconnects the jaw clutch components 82 and 91 and thereby separates the mechanism associated with the sprocket 94 from the centrifugal brake 78 (FIG. 8).

Figure 10:
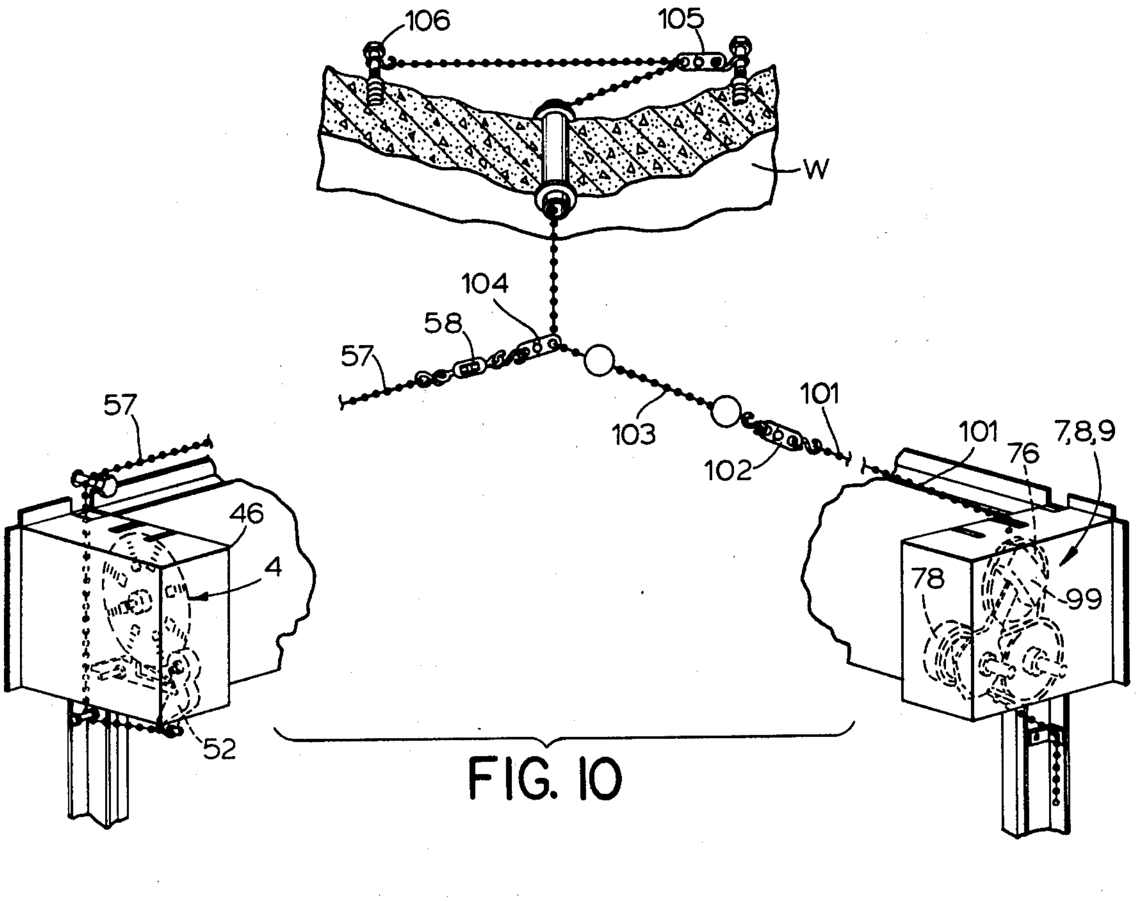
FIG. 10 is a partially schematic view showing one method of connecting the operating mechanisms to each other and to fusible links, where required on both sides of wall.

Said arm 88 and the weight 99 carried thereby are normally held in the raised position shown in FIG. 7 by a chain 101 which is connected in series with the fusible links 58 and 102. There are, of course, many ways in which the chain and fusible link may be connected within the scope of the prior art, but on specific way useful for the purposes herein is illustrated in FIG. 10. Here, the chain 101 is connected through the fusible link 102 and the chain 103 to the fusible link 58. The link 58 is connected to chain 104 which extends through a wall W, is connected to a fusible link 105 and thence anchored on bolt 106. The link 58 is also connected through the chain 57 to the catch 52 as above described. With this connection, the occurrence of a fire on either side of the wall W will melt one of the fusible links 58, 102 or 105 resulting in the simultaneous release of the chains 57 and 101 sufficiently to activate the tension wheel device 4 as above described and also to drop the arm 88, both of same occurring substantially simultaneously.

It has further been discovered that there exists a critical distance at which said sprockets may be centered and which without changing such center distance a number of sprockets within a useful range can be used. In this connection, by placing the sprocket centers a distance of 7.76 inches (plus 1/16" or minus ⅛") from each other, it is possible to use on such centers many ratios, such as any of the following arrangements:

| Sprocket Ratio | Sprocket Pitch |
|---|---|
| 48 teeth to 14 teeth | one-half inch |
| 38 teeth to 14 teeth | one-half inch |
| 36 teeth to 12 teeth | ⅝ inch |

OPERATION

While the operation of the apparatus has been generally indicated above, same will be reviewed hereinafter to facilitate an understanding of said invention.

With the apparatus installed as illustrated, and the springs 31, 32 and 33, or as required by the size and weight of the door or curtain 2, sufficiently pretensioned, the door is raised into its open position. Said raising may be by direct manual effort in the case of small doors or by applying rotative force from any convenient source to the sprocket 94, as above described. Such rotative force will act through the jaw clutch comprising the components 91 and 82 to rotate the sprocket 83 and thence through the chain and sprocket system 7 to rotate the barrel 11. This will wrap or wind the door thereon as desired normally with the lower edge of the door in a vertical position but not hanging appreciably if any distance from the barrel.

With little if any of the door hanging from the barrel 11, there is little tendency for same to unwind and it can be easily held until tension is applied to the springs.

The tension wheel device 4 is next loaded by effecting clockwise (as seen in FIG. 3) rotation of driving wheel 42. Same is carried out in any convenient manner, as by placing a rod R successively in the sockets 44 and effecting rotation thereby. While this is being carried out, the pawl 47 is hanging free as shown in FIG. 3A and the bolt 51 is removed until the proper tension is applied and is then inserted at the proper location. When said tension wheel 42 is properly loaded with the fusible link system including the chain 57 in place, the pawl 47 is then set into the catch 52 as shown in FIG. 3 and above described. Under these conditions, the pawl 68 of the impact device is in its inward position so that it does not interfere with rotation of the barrel 11. Lastly, the drop arm 88 is raised and the end of chain 101 adjacent thereto, which previously for purposes of setting the chain 57 has been anchored to a temporary point of anchorage, is now released and fixed as shown to the appropriate portion of the drop arm for holding it in raised position. The system is now ready for operation.

Obviously in view of the foregoing, other specific procedural steps, and order of steps, may be employed in the setting of the system as desired and the foregoing-described series of steps are for illustrative purposes only and not limiting.

If a fire occurs, and any of the fusible links 58, 102 or 105 is destroyed, two events happen virtually simultaneously.

First, the release of the chain 57 releases the catch 52 which in turn releases the pawl 47. This releases the bolthead 51 to permit the tension wheel 42 to respond to the tensioning means 43 and rotate rapidly in a counterclockwise direction. This causes the pawls 68 to fly outwardly, engage the lugs 67 and initiate rotation of the barrel 11, thereby removing all the tension of springs 31, 32, 33 from the barrel or roll 11 due to the barrel 11 and shaft 21 being rotated initially as a unit, thereby allowing the barrel to rotate freely until bolthead 51 comes into contact with the back end of pawl 47. This is enough to unwind a sufficient portion of the door to enable it to continue unrolling by gravity. At this time the rotational inertia of barrel 11 and the downward travel of slatted door 2 disengages pawl 68 from lug 67 (FIG. 5) and springs 31, 32, 33 are re-introduced into the system, but with a somewhat lesser amount of tension, to aid in controlling the downward descent of the door and to assist in lifting the door for emergency exit.

At the time of release of the chain 57, which is connected to the chain 101, the weight 99 is permitted to drop thereby reacting through the cams 87 and 92 to move the arm 88 rightwardly (as seen in FIG. 8) and disengage the jaw clutch means 82 and 91. This frees the centrifugal brake 78 and the sprocket system 7 associated therewith from any influence by the windup means 94, 112. With the adjustment of the centrifugal brake appropriately selected, it will limit the speed of unwinding of the roll as desired and prevent the door from dropping at an excessive rate.

If desired, for enabling the door to be opened in an emergency, such as to permit escape from a burning building, a chain 111 (FIG. 7) may be connected to the lower end 88A (FIG. 9) of the lever 88, as in the opening 88B, and thence to such means as a foot pedal (not shown). By depressing the foot pedal, the arm 88 is returned to its up position whereby the driving sprocket 94, due to the force of compression spring 98, is again connected to the sprocket 83 so that operation of the opening means, as the chain 112, will again open the door. When the foot pedal is released, the arm 88 will again drop to disconnect the sprocket 94 from the sprocket 83 and the door is again released for dropping into its closed position.

It will be apparent that the foregoing-described mechanism is in many instances only illustrative of many specific forms of apparatus usable within the scope of the invention. For example, the chain and fusible link system illustrated in FIG. 10 is desired for sensing heat levels on both sides of a wall in order that the melting of any of the fusible links 58, 102 or 105 will result in releasing the chains to permit simultaneous actuation of both the tension wheel 42 and the drop arm 88. Fusible link 105, for example, may be used alone if sensing on one side only of the wall is sufficient.

It will be apparent that a variety of chain or other control assemblies may be used for effecting the simultaneous release of the tension wheel and the drop arm upon the occurrence of a desired signal, here the softening of the fusible link. Likewise, and within the broader scope of the invention, it will be apparent that other specific devices, such as a weight loaded crank device, may be used for initiating rotation of the barrel and, likewise in a broader concept of the invention, other specific devices may be used, such as a gear train, for driving the centrifugal brake. Other variations from the specific form shown will readily occur to those skilled in the art.

Figure 11:
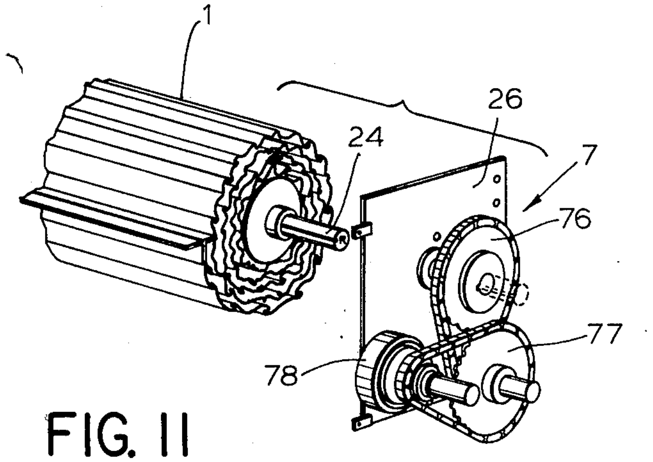
FIG. 11 is an oblique and partially exploded view of the same mechanism as shown in FIGS. 7 and 8 and showing a modification.

In FIG. 11 there is shown a system generally similar to that of FIGS. 1–10 excepting that the driving means for door opening purposes has been omitted. Here the roll mechanism 1 is mounted upon a rotatable shaft 24 which is drivingly connected through the sprockets 76 and 77 to a centrifugal brake 78 for operation in the same manner as above described. In this instance, however, the lift mechanism is omitted and the door will be opened in a conventional and known manner by manual effort. This is effective for smaller doors where power or mechanical assist means for door opening purposes is unnecessary.

Such variations being recognized and contemplated, the invention, at least in its broader concept, shall be deemed to include these variations excepting as the hereinafter appended claims may by their own terms specifically require otherwise.

The embodiments of the invention in which an exclusive property or privilege is claimed are defined as follows:

1. In a control device for a fire door having a roll with a flexible panel wrappable therearound, wherein said control device includes energy storage means releasable in response to a signal, such as the melting of a fusible link, for initiating unwrapping rotation of said roll, and wherein said roll after such initiating will continue to rotate in response to the gravitational effect on the panel unwrapping therefrom, the improvement comprising:

- shaft means coaxially affixed to said roll;
- actuating means connected to said shaft means for rotating same in a panel wrapping direction;
- frictional means operably connected to said shaft means for limiting the rate at which said panel is unwrapped from said roll;
- clutch means releasably connecting said frictional means to said actuating means, said clutch means having a pair of separable parts and resilient means urging said parts into driving engagement;
- disconnect means for disengaging said clutch means in response to said melting of said fusible link, said disconnect means including cam means operable to separate said parts, whereby to disengage said clutch means so that said shaft means is disconnected from said actuating means; and
- torque means mounted to move under the force of gravity to operate said cam means to disengage said clutch means, said movement of said torque means being responsive to said melting of said fusible link.

2. A device according to claim 1, wherein said frictional means is a centrifugal brake axially parallel with and radially spaced from said shaft means.

3. A device according to claim 1, wherein said actuating means is a plurality of chains and sprockets connected in series.

4. A device according to claim 1, including positive drive means drivingly connected between said roll and said frictional means, said positive drive means including at least one pair of sprockets and a drive chain connecting same, the center-to-center distance between said sprockets being approximately 7.76 inches.

5. In combination, a flexible door primarily for use as a fire door, a horizontally elongated rotatable roll upon which said flexible door may be wrapped, a first horizontally elongated shaft projecting outwardly from one end of said roll and being rotatably supported relative to said roll, a second horizontally elongated shaft coaxially alinged with said first shaft and projecting outwardly from the other end of said roll, said second shaft being supported for rotation relative to a stationary housing but being nonrotatably connected to said roll, and control means for controlling the rotation of said roll to thereby control the wrapping and unwrapping of the flexible door, said control means comprising:

- torsion spring means coacting between said first shaft and said roll for rotatably urging said roll in a direction tending to wrap the flexible door thereon so as to at least partially counterbalance the weight of said door when in a partially unwrapped condition;
- initiating means coacting between said stationary housing and said first shaft for positively initiating rotation of said first shaft, and said roll, in a door unwrapping direction whereby further rotation may then continue in response to gravity;
- said initiating means including a rotatable member secured to and rotatable with said first shaft and spring means for rotatably urging said rotatable member and said first shaft in said door unwrapping direction, said initiating means also including releasable means for normally preventing rotation of said rotatable member but permitting release and hence rotation of said rotatable member in response to a signal, such as the melting of a fusible link, and stop means cooperating with said rotatable member for permitting only a single revolution thereof;
- over-running means coacting between said first shaft and said roll for drivingly rotatably connecting said roll to said first shaft during the initial rotation of said first shaft to thereby initiate unwrapping of said door, said over-running means permitting continued rotation of said roll and over-running thereof relative to said first shaft after said first shaft is stopped by said stop means;
- speed responsive means actuatable in response to rotation of said roll for limiting the rotational speed of said roll to a predetermined value to thereby control the rate at which the door unwraps in response to gravity, said speed responsive means including speed-sensitive frictional braking means and positive drive means connected between said second shaft and said braking means, said positive drive means defining a substantial speed ratio so that said braking means is rotatably driven at a rate several times faster than the rotation of said roll;
- wind-up means drivingly connected to said second shaft for permitting driving rotation of said second shaft in a direction to permit wrapping of said door onto said roll, said wind-up means including normally-engaged clutch means for drivingly coupling said wind-up means to said second shaft; and
- disconnect means for disengaging said clutch means in response to the melting of said fusible link to thereby disconnect said wind-up means from said second shaft during the gravity-urged unwrapping of said door from said roll.

6. A combination according to claim 5, wherein said braking means is associated with a third rotatable shaft which is positioned in parallel relationship to said second shaft, said positive drive means including a chain-and-sprocket drive arrangement drivingly coupled between said second and third shafts, and said wind-up means being drivingly connected directly to said third shaft, said clutch means being associated directly with said third shaft.

7. A combination according to claim 6, wherein said braking means includes a rotatable friction braking element fixedly connected to said third shaft for rotation therewith.

* * * * *